March 20, 1962

T. A. McCOY 3,025,816

DRUM BODY SEAM ROLLING MACHINE

Filed May 18, 1959

INVENTOR.
Thomas A. McCoy
BY
Webster & Webster
ATTYS.

March 20, 1962 T. A. McCOY 3,025,816
DRUM BODY SEAM ROLLING MACHINE
Filed May 18, 1959 4 Sheets-Sheet 2

INVENTOR.
Thomas A. McCoy
BY Webster & Webster
ATTYS.

March 20, 1962 T. A. McCOY 3,025,816
DRUM BODY SEAM ROLLING MACHINE
Filed May 18, 1959 4 Sheets-Sheet 4

INVENTOR.
Thomas A. McCoy
BY
Webster & Webster
ATTYS.

United States Patent Office 3,025,816
Patented Mar. 20, 1962

3,025,816
DRUM BODY SEAM ROLLING MACHINE
Thomas A. McCoy, Stockton, Calif., assignor to Carando Machine Works, Stockton, Calif., a partnership
Filed May 18, 1959, Ser. No. 814,041
4 Claims. (Cl. 113—60)

In the manufacture of metallic drums an open-ended cylindrical body is first produced from a sheet formed to the shape of a cylinder and welded together, at adjacent or lapped ends, along a longitudinal seam which extends from end to end of such body; the welding being accomplished in a machine known as a "seam welder" and wherein the individual drum bodies advance, in axial alinement but spaced apart, in a longitudinal row.

After such seam welding takes place on the drum bodies the latter feed—in such row order—out of the seam welding machine, and at such time, it is desired to roll or mechanically "iron" the seam—while still hot and semi-plastic—so as to flatten or otherwise shape the same.

It is therefore the major object of this invention to provide a power actuated machine, of novel structure and function, operative to successively receive the seam welded drum bodies from an adjacent seam welding machine; to roll the seam of each passing drum body; and to advance the drum bodies in supported and guided relation a distance beyond the seam rolling point; all while maintaining the drum bodies in the same row order as they feed from the seam welding machine.

Another object of the invention is to provide the machine with a novel seam rolling unit designed to impart a positive and effective rolling or "ironing" action to the seam of each passing drum body.

An additional object of the invention is to provide the machine with a novel, longitudinally extending, drum body supporting and guiding horn which projects forwardly from the rolling unit and on which horn the drum bodies are power advanced from said rolling unit to a relatively remote discharge point.

A further object of the invention is to provide the machine with a novel mount which supports the longitudinally extending horn in a predetermined position while permitting the cylindrical drum bodies to surround and run on said horn from end to end thereof without obstruction.

It is also an object of the invention to provide a practical, reliable, and durable seam rolling machine, and one which will be exceedingly effective for the purpose for which it is designed.

These objects are accomplished by means of such structure and relative arrangement of parts as will fully appear by a perusal of the following specification and claims.

In the drawings:

FIG. 6 is a fragmentary plan view, on line 6—6 of FIG. 4, showing the upper portion of the rolling unit.

Figure 1:
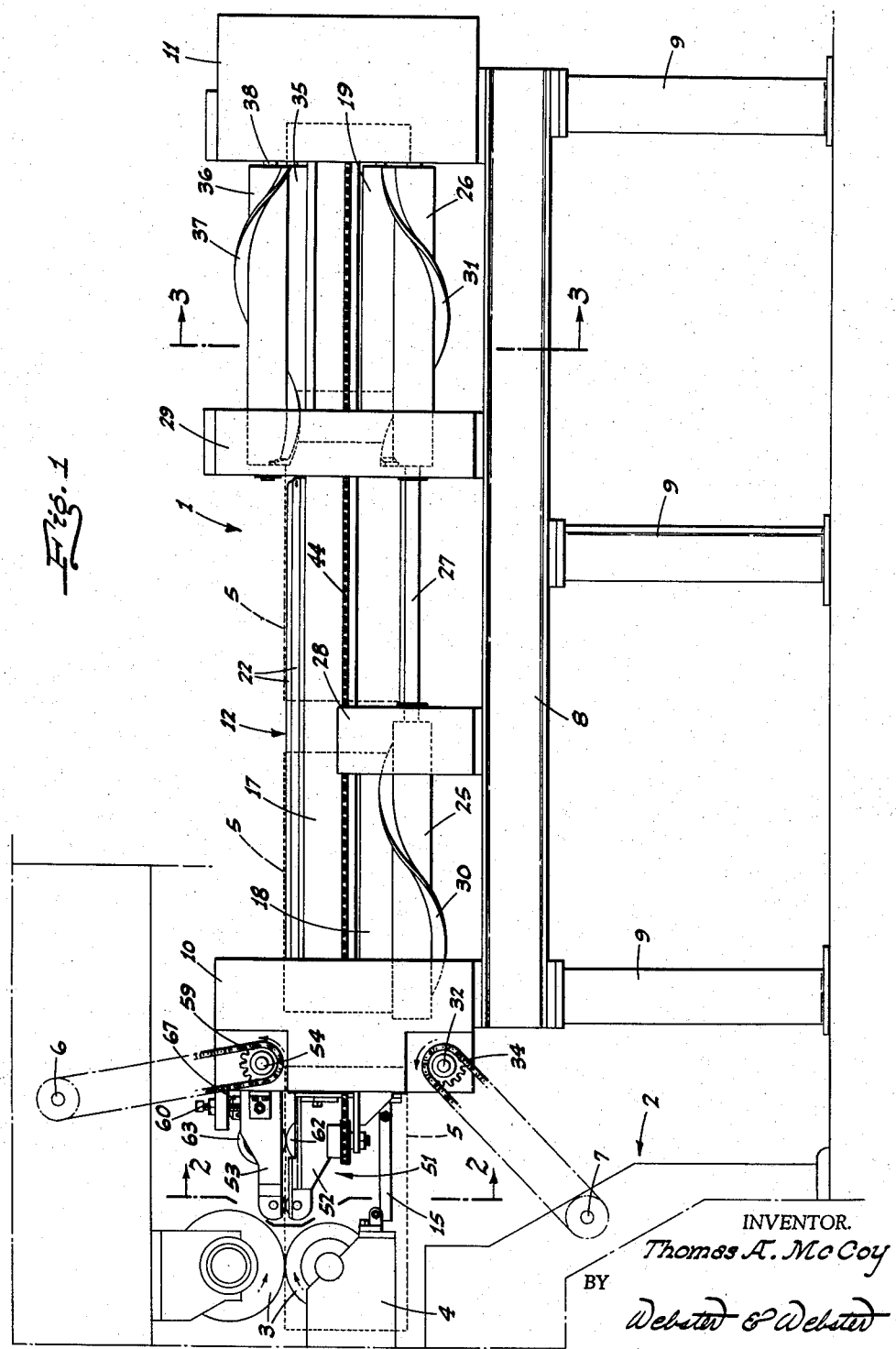
FIG. 1 is a side elevation of the drum body seam rolling machine, shown as associated with a seam welding machine.
Figure 2:
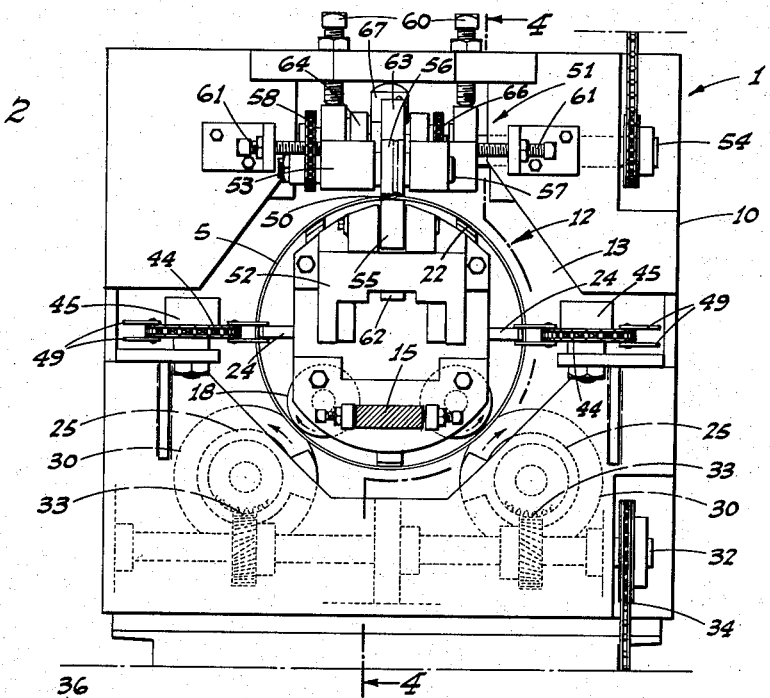
FIG. 2 is an enlarged transverse elevation on line 2—2 of FIG. 1.

Referring now more particularly to the drawings, and to the characters of reference marked thereon, the seam rolling machine which embodies the present invention and indicated generally at 1, is disposed in longitudinal alinement with and projects forwardly from the discharge end of a conventional seam welding machine, indicated generally at 2; the latter including—at said end—cooperating, transverse-axis welding rolls 3 disposed one above the other, and with the lowermost roll 3 journaled on a horn 4 on which each cylindrical drum body 5 advances with the seam uppermost for welding by said rolls. Additionally, the seam welding machine 2 incorporates an upper driven cross shaft 6 and a lower driven cross shaft 7, and from which the seam rolling machine 1 is actuated, as will hereinafter appear.

The seam rolling machine 1 is comprised of a longitudinal, above-floor bed 8 supported by legs 9; a rear end housing 10 and a front end housing 11 being fixed to and upstanding from the bed 8.

A longitudinal horn, indicated generally at 12, extends horizontally and substantially full length of the seam rolling machine 1, and at the related end portions such horn projects into the housings 10 and 11; the latter having enlarged openings therethrough—from face to face—indicated at 13 and 14 respectively, and such end portions of the horn are disposed in said openings in clearance relation to the corresponding housings. Thus, the cylindrical drum bodies 5, fed from the seam welding machine 1 onto the horn 12 and then conveyed and guided thereon for its full length, as will later appear, can freely pass through the housings 10 and 11.

Figure 3:
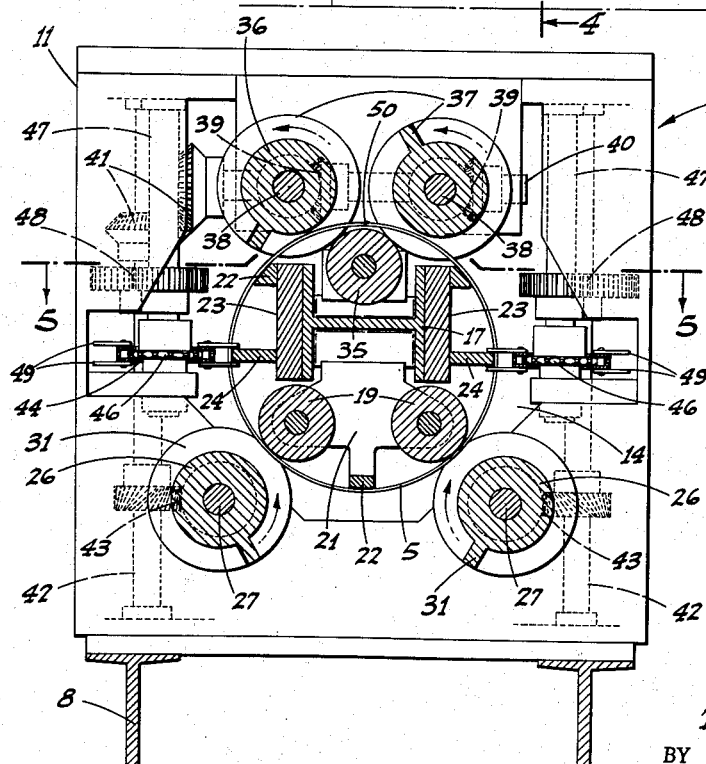
FIG. 3 is an enlarged transverse sectional elevation on line 3—3 of FIG. 1.

The horn 12 is prevented from rotation and longitudinal displacement by a heavy-duty link 15 pivotally connected between the forward end of horn 4 and the rear end plate 16 of such horn 12; the latter—which has no direct connection with the housings 10 and 11—being constructed, and supported in position—so that drum bodies 5 can surround and be advanced on said horn 12 for its full length without obstruction—as follows:

The horn 12 is comprised of a longitudinal beam 17 fixed at its rear end to the upper portion of the rear end plate 16 and thence projecting horizontally forward to the opposite end of the machine; such beam being of substantial H-shape, and a representative section of which is shown in FIG. 3.

Figure 4:
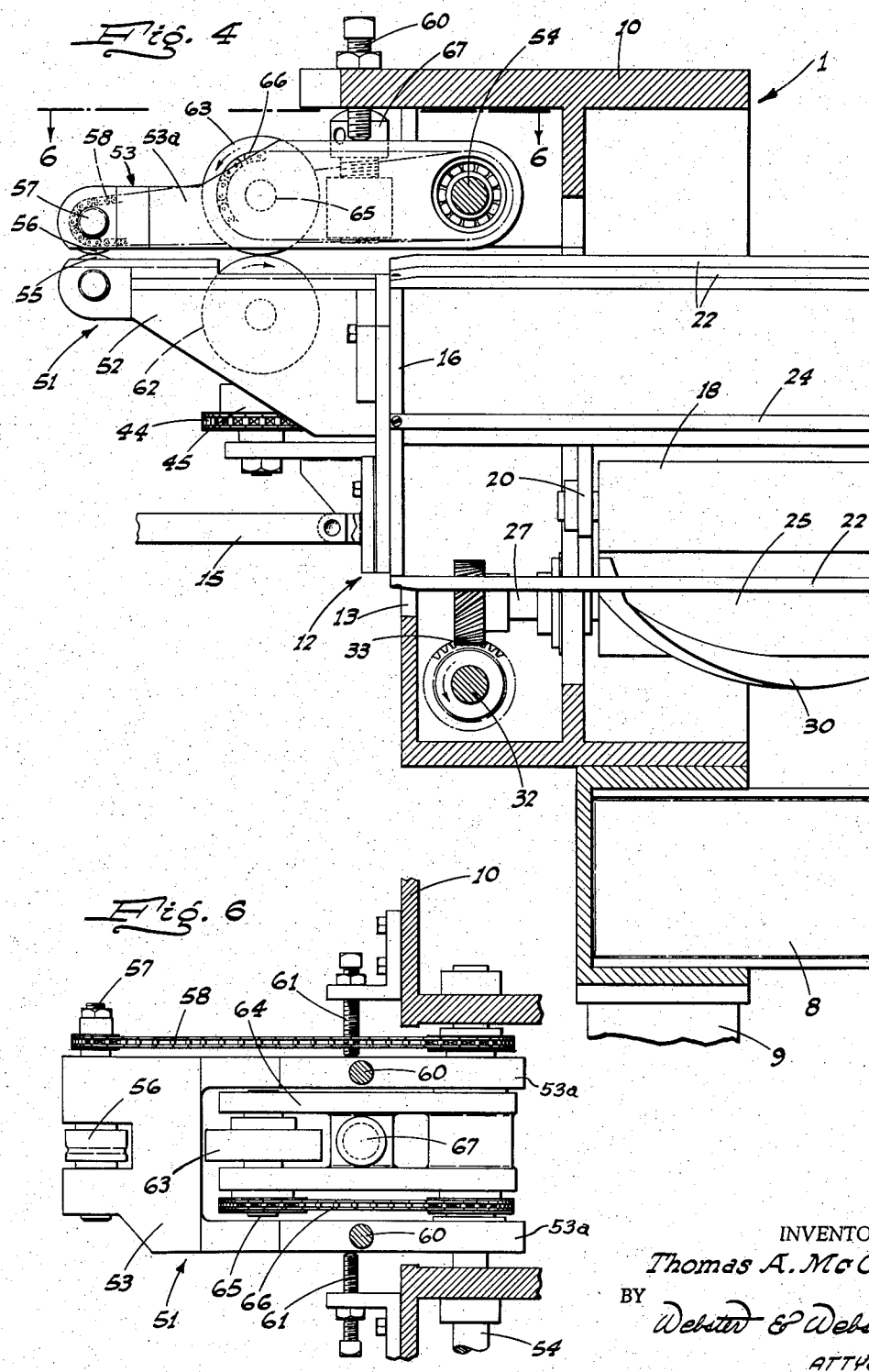
FIG. 4 is a fragmentary longitudinal sectional elevation, on line 4—4 of FIG. 2, showing the seam rolling unit and adjacent portion of the machine.

A pair of longitudinal, transversely spaced rollers 18 are disposed beneath the rear portion of beam 17, while another such pair of rollers 19 are disposed beneath the front portion of said beam; the related rollers of said pairs being in axial alinement, and with all the axes parallel to the axis of the drum bodies which are received and advanced on horn 12. The rollers 18 and 19 are journaled in brackets fixed to and depending from the beam 17, as—for example—at 20 in FIG. 4 and 21 in FIG. 3.

In addition to the pairs of rollers 18 and 19, the horn 12 includes, in the length thereof, a plurality of longitudinal guide bars—all identified at 22—suitably secured to the horn structure and disposed in circumferentially spaced relation to a drum body on the horn and in position to closely but slidably support the same from the inside. The rollers 18 and 19 are also disposed to relatively slidably enter each passing drum body and to provide further guide means.

In addition to the guide bars 22, and rollers 18 and 19, the horn 12 is fitted on opposite sides 23 of beam 17 with full length, laterally outwardly projecting rails 24 which serve as further guide means within the drum bodies on said horn, as well as for another purpose, as will later appear.

The horn 12, constructed as above described, is supported from beneath by a pair of longitudinal transversely spaced driven rollers 25 below and laterally outwardly offset from rollers 18, and a similar pair of driven rollers 26 below and laterally outwardly offset from rollers 19; the longitudinally related rollers 25 and 26 being in axial alinement and fixed on a common drive shaft 27 which extends between and is journaled in the housings 10 and 11. Intermediate the longitudinally related rollers 25 and 26 each of the shafts 27 is journaled, as shown, and for stability—in rigid frames 28 and 29 which upstand—in spaced relation—from the bed 8 intermediate the housings 10 and 11; such frames being formed to clear the horn 12 and drum bodies passing thereon.

Figure 5:
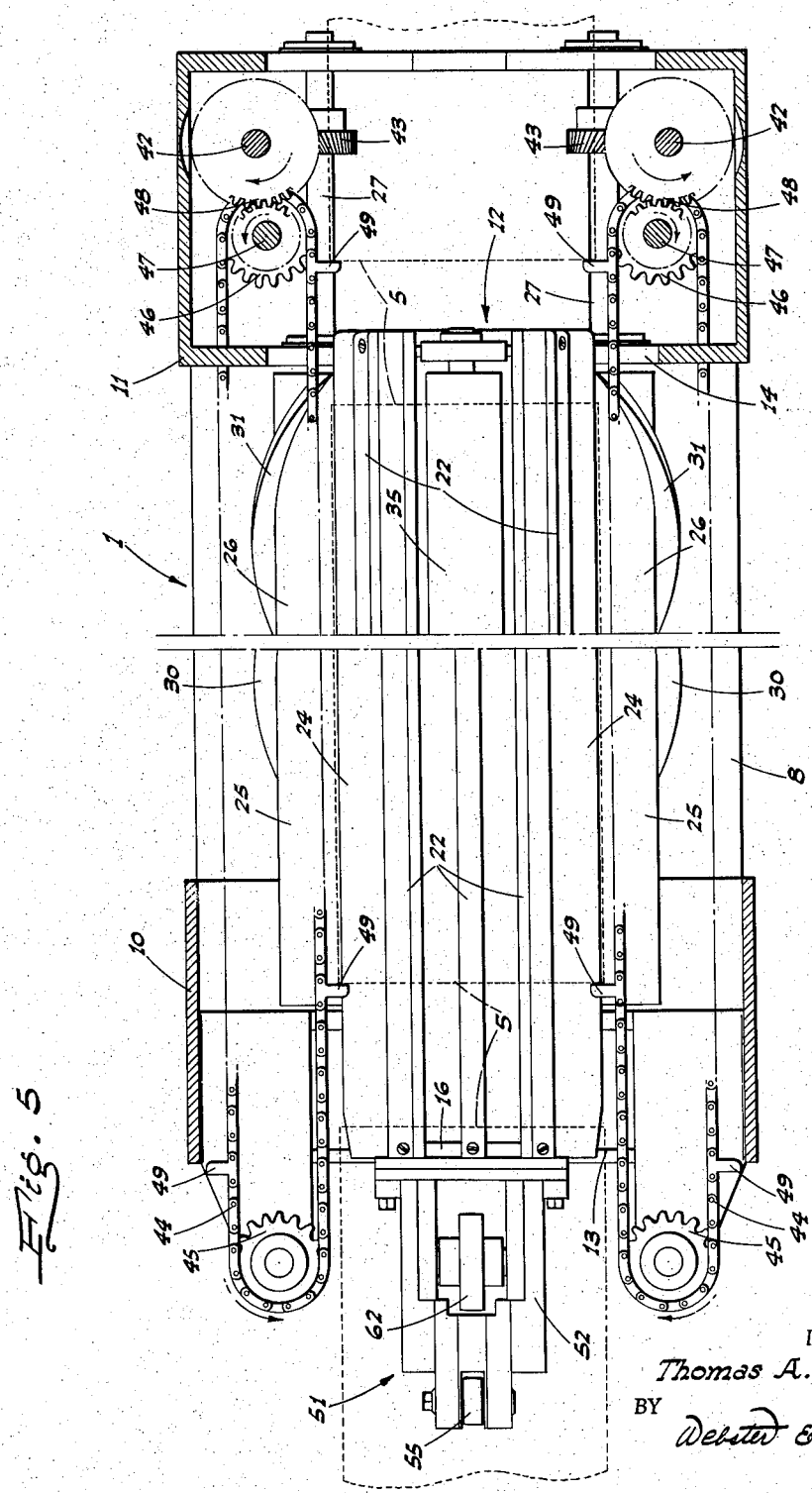
FIG. 5 is a foreshortened, longitudinal plan view, on line 5—5 of FIG. 3, showing particularly the lower portion of the seam rolling unit, and driven feed chains which cooperate with the horn.

Each of the rollers 25 includes thereon a long pitch spiral rib 30 which engages and supports the corresponding horn roller 18, while a like spiral rib 31 on each roller 26 engages and supports the corresponding horn roller 19; the rollers 25 and 26, and the spiral ribs 30 and 31 thereon, thus effectively supporting the horn 12. The drum bodies are advanced on the horn 12 with adjacent ends spaced apart, as indicated in FIGS. 1 and 5, and the spiral ribs 30 and 31 are of a length and pitch and turn in a direction so that—with proper timing in the machine—the point of contact of said ribs with the horn rollers always occurs in the space between the adjacent ends of said drum bodies; this being a very advantageous feature as it permits the horn 12 to be properly supported while permitting the drum bodies to travel the length of the horn without interference from or contact by the horn supporting arrangement.

The longitudinal shafts 27 are each driven from within housing 10, from a cross shaft 32, by a pinion and gear assembly 33; the cross shaft 32 being actuated from exteriorly of housing 10 by an endless chain and sprocket unit 34 which leads from the lower driven shaft 7 of the seam welding machine 2.

In order to prevent any vertically upward deflection of the horn 12 at its forward end portion—i.e. adjacent housing 11—the following arrangement is employed:

A longitudinal roller 35 is journaled in the upper part of the forward portion of beam 17 and corresponds generally to the rollers 19 but occupies a position above and centrally between the latter; such roller 35 being in a position to be received in each passing drum body at the top thereof.

A pair of transversely spaced, longitudinal, driven rollers 36 extend between and are journaled in connection with the housing 11 and upstanding frame 29 in a plane above roller 35; the rollers 36 being laterally outwardly offset equi-distantly on opposite sides of said roller 35. Each of the rollers 36 includes a long pitch spiral rib 37 which rides on the roller 35 in hold-down relation. The spiral ribs 37 of rollers 36 cooperate with the roller 35 in the same manner as spiral ribs 30 and 31 of rollers 25 and 26 cooperate with rollers 18 and 19 to permit the adjacent drum bodies to freely advance on the horn; i.e., the point of engagement of ribs 37 with roller 35 is always in the space between adjacent ends of the advancing drum bodies.

The rollers 36 are carried on longitudinal shafts 38, and within housing 11 said shafts 38 are each driven by a pinion and gear assembly 39 from a cross shaft 40; the latter being actuated through a pinion and gear assembly 41 from one of a pair of vertical shafts 42 journaled in housing 11 laterally outwardly from the horn 12. The vertical shafts 42 each derives its motion from the adjacent one of the longitudinal shafts 27, through the medium of a pinion and gear assembly 43.

The drum bodies 5, as received on horn 12 from the seam welding machine 2, are advanced on said horn in predetermined timed and spaced relation by means of the following:

Laterally outwardly of each side of the horn 12 there is an endless conveyor chain 44 disposed in the plane of and adjacent the corresponding guide rail 24 of said horn. Each such chain includes an outer run and an inner run as shown; the inner run traveling in close but spaced parallel relation to said corresponding guide rail 24. Each conveyor chain is trained at the rear about a vertical-axis sprocket 45 journaled in connection with housing 10, and at the front is trained about a vertical-axis sprocket 46 on an upstanding stub shaft 47 journaled in housing 11 and driven from the adjacent vertical shaft 42 by a gear assembly 48. The drive is in a direction so that the inner run of each conveyor chain 44 travels forwardly.

Fork-type pusher lugs 49 project outwardly from each conveyor chain 44 with predetermined equal spacing in the length thereof; such pusher lugs, when in the inner run of the chain 44 straddling and running on the adjacent guide rail 24. As each drum body is received on the rear end of the horn 12, such drum body is engaged at the rear end by one of the pusher lugs 49 and advanced thereby for the full length of said horn and slightly therebeyond for discharge at the front of the machine through the housing 11. As so advanced the adjacent ends of advancing drum bodies are maintained in properly spaced relation and for the purpose previously described.

As the drum bodies 5 transfer from the welding rolls 3 of welding seam machine 2 and onto the horn 12 of the seam rolling machine 1, the seam 50 of each drum is at top center thereof; such seam being rolled or ironed immediately after leaving the welding rolls 3 by means of a rolling unit, indicated generally at 51. The seam rolling unit 51 projects longitudinally rearwardly from housing 10 and is mounted in part thereon and in part on the rear end of horn 12. The unit 51 comprises a rigid lower yoke 52 fixed to and projecting rearwardly from the rear end plate 16 of horn 12, and an upper yoke 53 pivoted at its forward end on a cross shaft 54 journaled in housing 10 above the rear end of the horn 12; the upper yoke 53 projecting rearwardly above and in alinement with said lower yoke 52; said upper yoke 53 including transversely spaced arms 53a.

At their rear ends, closely adjacent and longitudinally alined with the welding rolls 3, the yokes 52 and 53 are fitted with cooperating transverse-axis seam rolling wheels 55 and 56, respectively. The upper, seam rolling wheel 56 is carried on a transverse spindle 57 driven from cross shaft 54 by an endless chain and sprocket unit 58. The cross shaft 54 is actuated by an endless chain and sprocket unit 59 connected to the upper cross shaft 6 of the seam welding machine 2.

As each drum body 5 passes between the rolling wheels 55 and 56, the welded seam 50 is effectively rolled or ironed thereby; the wheel 56 being driven to assure of a positive rolling action and continued advance of the engaged drum body. In order to maintain the necessary and forceful downward pressure on rolling wheel 56, adjustable vertical set screws 60 are mounted on housing 10 and bear on the upper yoke arms 53a rearwardly of cross shaft 54.

The lateral alinement of upper yoke 53 with lower yoke 52 is maintained by opposed adjustable set screws 61 mounted horizontally on housing 10 and bearing on the sides of said upper yoke.

A short distance ahead of the rolling wheels 55 and 56, the rolling unit 51 includes another set of cooperating transverse-axis wheels, indicated at 62 and 63; the lower wheel 62 being journaled in the rigid lower yoke 52. The upper wheel 63 is journaled in the rear end of a secondary longitudinal yoke 64, lying within the confines of yoke 53 between the arms 53a thereof, and pivoted at its forward end on shaft 54 independently of the yoke 53. The upper wheel 63 is carried in the secondary yoke 64 on a transverse spindle 65 driven by an endless chain and sprocket unit 66 from the cross shaft 54; there being an adjustment screw 67 between said secondary yoke 64 and an upper part of housing 10 to assure that the upper wheel 63 remains in close cooperating relation to the lower wheel 62, and to the end that a drum body passing therebetween is further assured of proper and continuing advance in the direction of and onto the horn 12. Also, the wheels 62 and 63 act as secondary seam ironing or smoothing elements.

With the described seam rolling machine 1, drum bodies 5 as fed from the seam welding machine 2 are first effectively rolled by the unit 51, and thence received on and advanced along the horn 12 for delivery therefrom at the forward end; all in a fast, in-line, continuous, and timed operation.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a machine for rolling the pre-welded longitudinal seam of open-ended drum bodies, a longitudinal horn to one end of which a row of drum bodies is fed, the horn being adapted for the reception thereover and advance thereon of such row of bodies in predetermined spaced relation, body advancing means comprising endless driven chains mounted on opposite sides of the horn, vertical-axis end sprockets about which the chains are trained or arranged so that the laterally inward runs of the chains are parallel to and adjacent the row of drum bodies, laterally alined pusher lugs on and spaced lengthwise of said runs of the chains projecting horizontally therefrom and engaging the rear ends of the drum bodies, and means on the horn to engage the lugs on said laterally inward runs of the chains and maintain such runs in straight alinement in a horizontal plane between the end sprockets.

2. A machine for rolling the longitudinal seam of an open-ended drum body as fed between and welded by the upper and lower welding members of a seam welding machine, the seam rolling machine comprising a rigid horn onto which the drum body passes after welding of the seam, means supporting the horn in a manner to permit advance of the drum body along such horn from end to end thereof, means for so advancing the drum body, a housing upstanding from the horn at the end nearest the welding members, cooperating upper and lower seam rolling wheels supported from the housing and horn, respectively, means to vertically adjust the upper wheel relative to the lower wheel, cooperating upper and lower secondary seam rolling wheels supported from the housing and horn, respectively, and disposed beyond the first named rollers with respect to the seam welding members, means to vertically adjust the upper secondary wheel relative to the corresponding lower wheel and independently of the adjustment of the first named upper wheel, a driven shaft journaled in the housing, and means to drive both upper rollers from the shaft at the same peripheral speed and without interfering with the independent adjustment thereof.

3. A machine for rolling the longitudinal seam of an open-ended drum body as fed between and welded by the upper and lower welding members of a seam welding machine, the seam rolling machine comprising a rigid forwardly projecting horn onto which the drum body passes after welding of the seam, means supporting the horn in a manner to permit advance of the drum body along the horn from end to end thereof, means to so advance such drum body, a housing upstanding from the horn at the end thereof nearest the welding members, a pair of upper and lower seam rolling wheels disposed relatively close to the seam welding members, means supporting the lower roller from the horn, a yoke in which the upper roller is mounted and including transversely spaced side arms, a cross shaft journaled in the housing ahead of the upper roller and on which the yoke arms at their forward ends are turnably mounted, means between the housing and yoke to adjust the latter vertically about the cross shaft as an axis, a secondary pair of upper and lower seam engaging wheels disposed in a vertical plane intermediate the first named wheels and the cross shaft, the lower wheel of the secondary pair being mounted in connection with the first named lower wheel, another yoke disposed between the arms of the first named yoke and in which other yoke the upper wheel of the secondary pair is mounted, said other yoke at its forward end being turnably mounted on the cross shaft independently of the first named yoke, means between the housing and the last named yoke to adjust the latter vertically about the cross shaft as an axis and independently of the adjustment of the first named yoke, the axes of the upper rollers being parallel to the cross shaft, and separate chain drives between the shaft and said upper rollers.

4. A machine for rolling the pre-welded longitudinal seam of open-ended metallic drum bodies fed in predetermined spaced relation in a row and with the seams alined comprising a longitudinal horn to one end of which the row of drum bodies feeds, the horn being adapted for the reception and advance thereon in surrounding relation of said row of drum bodies, means supporting the horn in a manner to permit advance of the drum bodies therealong from said one end to the other end, a seam rolling unit mounted adjacent said one end of the horn operative to roll the seam of drum bodies as fed onto the horn, means to engage the drum bodies at their rear ends and on opposite sides thereof to advance said bodies along the horn, said means comprising endless driven chains mounted on opposite sides of the horn, end sprockets about which the chains are trained and arranged so that the laterally inward runs of the chains are parallel to and adjacent the row of drum bodies, and laterally alined pusher lugs on and spaced lengthwise of said runs of the chains projecting horizontally therefrom and engaging the rear ends of the drum bodies, and means between the horn and the adjacent runs of the chains and including said pusher lugs to maintain such runs in straight alinement in a horizontal plane between the end sprockets; said means comprising longitudinal side rails on opposite sides of and rigid with the horn and projecting laterally out to substantially engage the inner surface of the drum bodies, the pusher lugs being forked and straddling the rails.

References Cited in the file of this patent

UNITED STATES PATENTS

| | | |
|---|---|---|
| 659,156 | Norton | Oct. 2, 1900 |
| 835,096 | Burlingame | Nov. 6, 1906 |
| 1,318,871 | Heine | Oct. 14, 1919 |
| 1,333,550 | Kruse | Mar. 9, 1920 |
| 1,448,917 | Dodge | Mar. 20, 1923 |
| 1,983,930 | Carlsen | Dec. 11, 1934 |
| 2,015,804 | McGarry | Oct. 1, 1935 |
| 2,563,496 | Schmidt | Aug. 7, 1951 |